(12) United States Patent
Hashizume et al.

(10) Patent No.: US 6,311,917 B1
(45) Date of Patent: Nov. 6, 2001

(54) TAPE REEL FOR TAPE CASSETTE

(76) Inventors: Kenji Hashizume, 1726-7, Maseguchi, Miyota-machi, Kitasaku-gun, Nagano-ken; Shinichi Sato, 934-3, Wada, Komoro-shi, Nagano-ken; Hiroshi Kaneda, 925-51, Mimayose, Asashina-mura, Kitasaku-gun, Nagano-ken; Masatoshi Okamura, 411, Yokowa, Saku-shi, Nagano-ken, all of (JP)

( * ) Notice: Subject to any disclaimer, the term of this patent is extended or adjusted under 35 U.S.C. 154(b) by 0 days.

(21) Appl. No.: 09/150,951

(22) Filed: Sep. 10, 1998

(30) Foreign Application Priority Data

Sep. 10, 1997 (JP) .................................................. 9-261110

(51) Int. Cl.[7] .................................................. B65H 75/14
(52) U.S. Cl. .................. 242/342; 242/610.6; 242/611.2; 242/613.4
(58) Field of Search .............................. 242/342, 610.6, 242/611, 611.2, 613, 613.4

(56) References Cited

U.S. PATENT DOCUMENTS

| | | | |
|---|---|---|---|
| 4,262,856 | * | 4/1981 | Nakagawa .......................... 242/611.2 |
| 4,371,123 | * | 2/1983 | Watanabe ........................... 242/610.6 |
| 4,511,099 | * | 4/1985 | Nunokawa et al. ................ 242/610.6 |
| 4,605,511 | * | 8/1986 | Machida ............................. 242/610.6 |
| 4,664,328 | * | 5/1987 | Yamada .............................. 242/610.6 |
| 4,760,972 | * | 8/1988 | Sasaki et al. ....................... 242/610.6 |
| 4,807,826 | * | 2/1989 | Iwahashi ............................ 242/610.6 |
| 4,923,137 | * | 5/1990 | Jorgensen et al. .................... 242/613 |
| 5,039,024 | * | 8/1991 | Taniguchi ........................... 242/610.6 |
| 5,252,369 | * | 10/1993 | Akao et al. ........................ 242/610.6 |
| 5,257,749 | * | 11/1993 | Liepold et al. ..................... 242/611.2 |
| 5,472,150 | * | 12/1995 | Teuber et al. ......................... 242/613 |
| 5,873,543 | * | 2/1999 | Schneider et al. ................. 242/611.2 |

FOREIGN PATENT DOCUMENTS

| | | | | |
|---|---|---|---|---|
| 2 040 264 | * | 8/1980 | (GB) ................................ 242/613.4 |
| 4-228160 | * | 8/1992 | (JP) .................................. 242/611.2 |

* cited by examiner

Primary Examiner—John P. Darling (57) ABSTRACT

A tape reel for a tape cassette wherein a pair of such reels are contained, comprising an upper flange and a hub which consists of a drum formed integrally with (formed in one piece with, or solidly joined to) a lower flange. The drum comprises an outer cylindrical part on which a tape is wound and an inner cylindrical part which permits the insertion of a driving shaft of a recording-reproducing device for the tape cassette. The inner cylindrical part has projections adapted to engage with the driving shaft, each said projection having a groove formed on the back side for thickness reduction, and the inner cylindrical part and inner ends and both side walls of the projections all have the same thickness. A plurality of connecting ribs are provided joining the outer and inner cylindrical parts of the drum, and extensions are formed outwardly on the inner cylindrical part, on both shoulder portions close to each said connecting rib. Alternatively, a plurality of ribs are formed along the inner circumference of the outer cylindrical part, extending from the outer cylindrical part toward, but short of, the inner cylindrical part.

3 Claims, 7 Drawing Sheets

TAPE REEL FOR TAPE CASSETTE

BACKGROUND OF THE INVENTION

1. Field of the Invention

This invention relates to a tape reel for a tape cassette, such as a VHS cassette or 8 mm video cassette, that holds within its housing a pair of reels around which a length of tape is wound.

2. Description of the Prior Art

Figure 7:
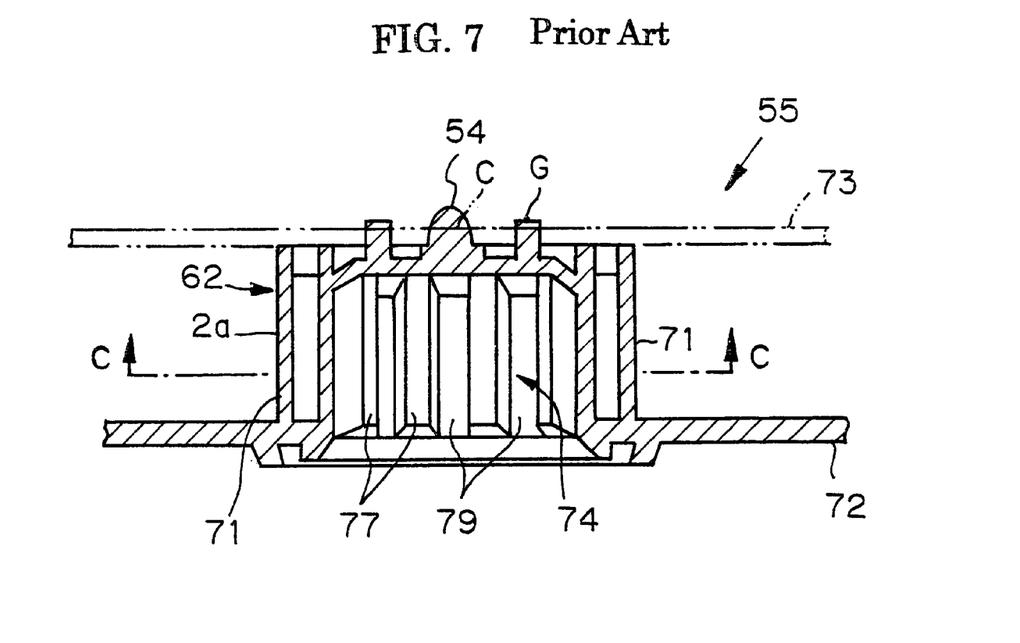
FIG. 7 is a sectional view of a conventional tape reel.
Figure 8:
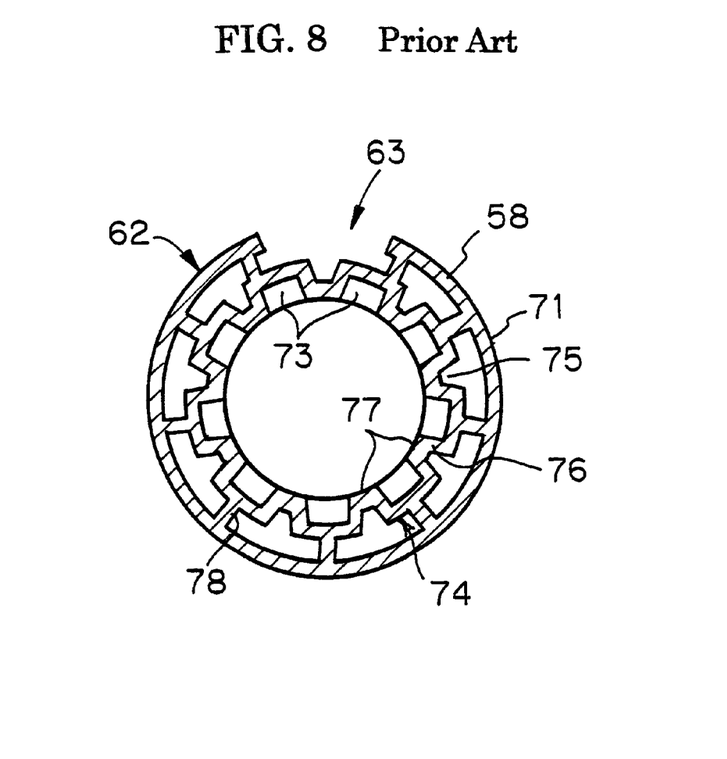
FIG. 8 is a sectional view of a conventional tape reel, taken on the line C—C of FIG. 7.

Contrivances for making tape reels as light as possible, while reducing the distortion due to uneven curing of the resin at the time of molding and minimizing the sacrifice of strength, have been proposed in prior art documents, for example, by Japanese Patent Application Kokai No. 55-87352. FIGS. 7 and 8 in the accompanying drawings illustrate an embodiment of the invention described in the specification of the above application. A tape reel 55 is shown comprising a hub which consists of a central drum 62 formed in one piece with, or solidly joined to, a lower flange 72, and an upper flange 73 fixed to the hub, with a spring (8 in FIG. 1) pressing a center boss 54 at the top of the central drum 62 in place. The central drum 62 consists of an outer cylindrical part 71 on which a tape is wound and an inner cylindrical part 74 adapted to receive a reel drive shaft (not shown) of a device into which the cassette is to be loaded. The inner cylindrical part 74 has a hollow 79 formed open at the bottom and extending short of the top of the part, so that the driving shaft of the recording-reproducing device can enter the inner cylindrical part 74 to drive the tape reel 55. The inner cylindrical part 74 has a plurality of inward projections 77 adapted to mesh with the driving shaft. Each of the projections 77 has a groove 75 formed on the back side to reduce its thickness. The back grooves 75 must be limited in size lest they should cause inward deformation of the inner cylindrical part 74 under pressure from the tape wound thereon, which would decrease the diameter of the center hollow and hamper the insertion of the driving shaft from the recording-reproducing device. The outer cylindrical part 71 and the inner cylindrical part 74 are secured together with a plurality of connecting ribs 78.

If the inner cylindrical part 74, its inward projections 77 and side walls 76 were thus made as thin as possible while avoiding substantially unfavorable effect upon their strength, it would lead to uniform cooling of the resin after molding, reduction of molding strains, and shortening of the molding cycle.

However, the prior art technique described above is still unable to realize the shortening of the molding cycle satisfactorily. With the conventional design the inner ends of the projections 77 have to be thicker than the rest of the inner cylindrical part to cope with the speedup of the molding cycle. This naturally increases molding shrinkage which tends to cause malformation of the inner cylindrical part, but the problem has not been completely settled yet. If the inner cylindrical part is made as thin as the remainder by increasing the depth of the back grooves, there will be the danger of the bore of the inner cylindrical part 74 being deformed under the pressure, transmitted through the connecting ribs 78, of the tape when the cassette has been stored for long with the tape wound thickly on the particular inner cylindrical part. This is particularly true with an inner cylindrical part of a cassette left inserted in a recording-reproducing device whose internal temperature is higher than the ambient temperature at which the cassette is ordinarily stored. Once the inner cylindrical part has been deformed to such an extent that it does not receive the driving shaft of the device when the cassette is loaded into the device, recording or reproducing will no longer be possible.

In view of these, the present invention aims at providing a tape reel equipped with means to prevent the deformation of the inner cylindrical part when it is made up of walls of the same thickness and thereby accelerating the molding cycle and reducing the molding strains of tape reels.

BRIEF SUMMARY OF THE INVENTION

The invention settles the prior art problems by means of:

(1) thickness-reducing grooves formed axially at the back of the ribs of the inner cylindrical part to allow the inner cylindrical part and walls that constitute its projections to have the same (constant) thickness throughout;

(2) extensions from both shoulder portions of connecting ribs formed on the inner cylindrical part toward the outer cylindrical part; and (3) separating the outer and inner cylindrical parts of each reel hub by dispensing with ribs connecting the two parts.

Thus the invention provides a tape reel for a tape cassette wherein a pair of such reels are contained, comprising an upper flange and a hub which consists of a drum formed integrally with (formed in one piece with, or solidly joined to) a lower flange, said drum comprising an outer cylindrical part on which a tape is wound and an inner cylindrical part which permits the insertion of a driving shaft of a recording-reproducing device for the tape cassette, characterized in that the inner cylindrical part has projections adapted to engage with the driving shaft, each said projection having a groove formed on the back side for thickness reduction, and the inner cylindrical part and inner ends and both side walls of said projections all have the same thickness.

Such an inner cylindrical part having the same thin wall throughout has not been realized by the prior art. According to the present invention, a plurality of connecting ribs are provided joining the outer and inner cylindrical parts of the drum, and extensions are formed outwardly on the inner cylindrical part, on both shoulder portions close to each said connecting rib.

As alternative means, under the invention, a plurality of ribs are formed along the inner circumference of the outer cylindrical part, extending from the outer cylindrical part toward, but short of, the inner cylindrical part.

The invention thus provides a tape reel for a tape cassette characterized in that the inner cylindrical part of its hub drum has projections adapted to engage with the driving shaft of a recording-reproducing device, each said projection having a groove formed on the back side for thickness reduction, and the inner cylindrical part and inner ends and both side walls of said projections all have the same thickness. The structure prevents molding strains and permits shortening of the molding cycle. The prior art has not realized such an inner cylindrical part having the same thin wall throughout.

Under the invention, a plurality of connecting ribs are provided joining the outer and inner cylindrical parts of the drum, and extensions are formed outwardly on the inner cylindrical part, on both shoulder portions close to each said connecting rib. These extensions bear up under the pressure that a roll of tape applies to the inner cylindrical part and protect the part against deformation.

The invention alternatively provides a plurality of ribs formed along the inner circumference of the outer cylindrical part, extending from the outer cylindrical part toward, but short of, the inner cylindrical part. The ribs reinforce the outer cylindrical part and enhances the independence of the inner cylindrical part, with the result that the pressure of the tape wound up on it is taken up by the outer cylindrical part and the inner cylindrical part is protected against deformation.

BRIEF DESCRIPTION OF THE DRAWINGS

FIG. 3 shows the lower hub of the first embodiment; (a) being a plan view, (b) a side view, and (c) a bottom view;

FIG. 4 shows, on an enlarged scale, the drum of the first embodiment; (a) being a plan view and (b), a sectional view taken on the line A—A of FIG. 3;

FIG. 5 shows the lower hub of the second embodiment; (a) being a plan view, (b) a side view, and (c) a bottom view;

FIG. 6 shows, on an enlarged scale, the drum of the second embodiment; (a) being a plan view and (b), a sectional view taken on the line A—A of FIG. 3;

DETAILED DESCRIPTION OF THE PREFERRED EMBODIMENTS

Figure 1:
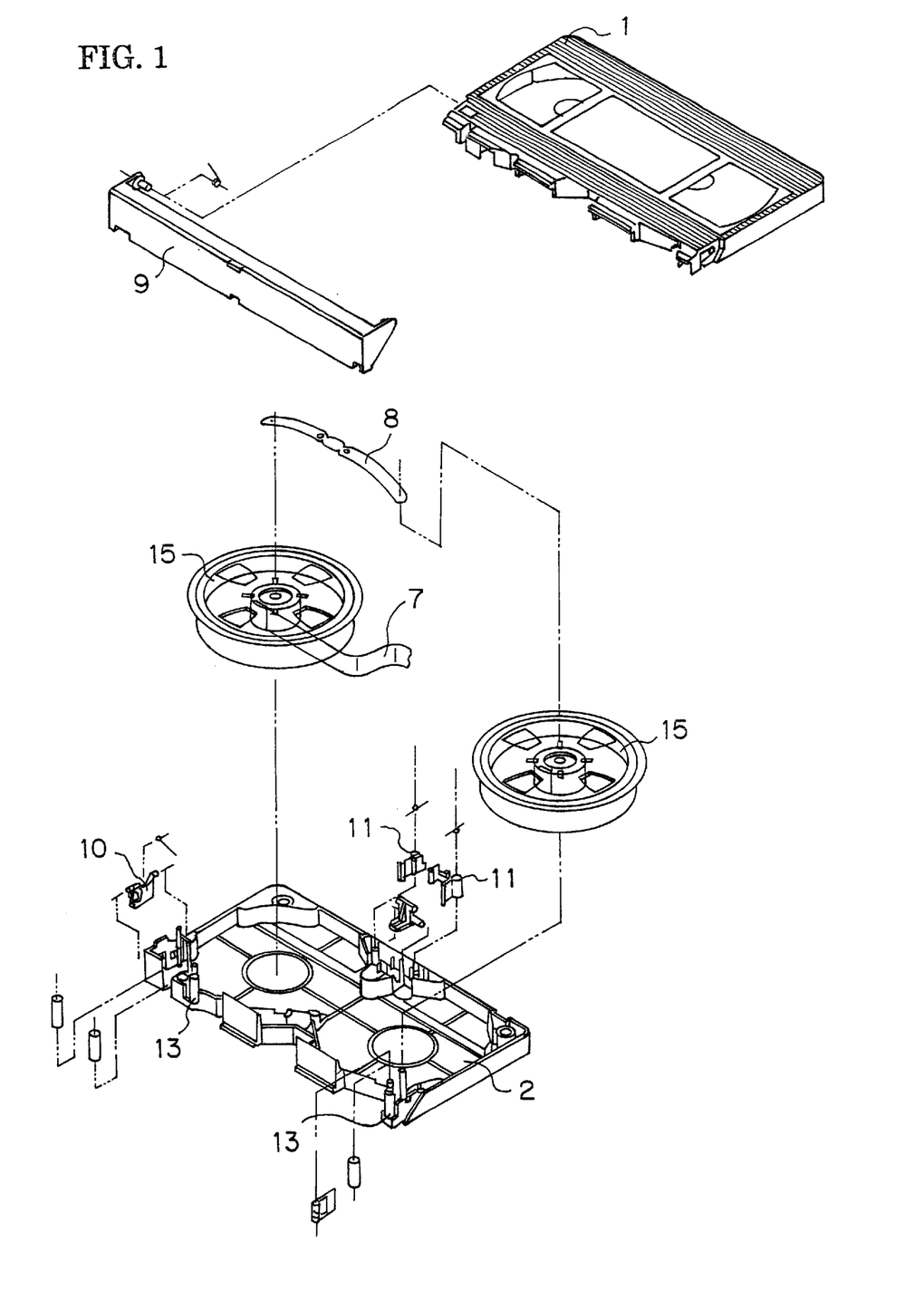
FIG. 1 is an exploded view of a tape cassette according to the present invention.

Two embodiments of the invention will now be described in detail with reference to the accompanying drawings.
First Embodiment:

FIG. 1 is an exploded view of a VHS video cassette into which the tape reels according to the present invention can be incorporated. In a cassette housing composed of upper and lower half casings 1, 2 are turnably held a pair of tape reels 15. A roll of tape 7 wound on one tape reel 15 is unwound, past an opening 13 formed at the front of the housing, and is taken up through another opening 13 by the other tape reel 15. A front lid 9 pivotally turnable with respect to the housing for open-close motion is provided on the front of the housing to protect the tape portion exposed between the two openings. The front lid 9 is normally kept closed with a lid lock 10 lest it open unintentionally while the cassette is not in use. Inside the upper casing 1 is held a spring 8 which urges the tape reels 15 downward.

Figure 2:
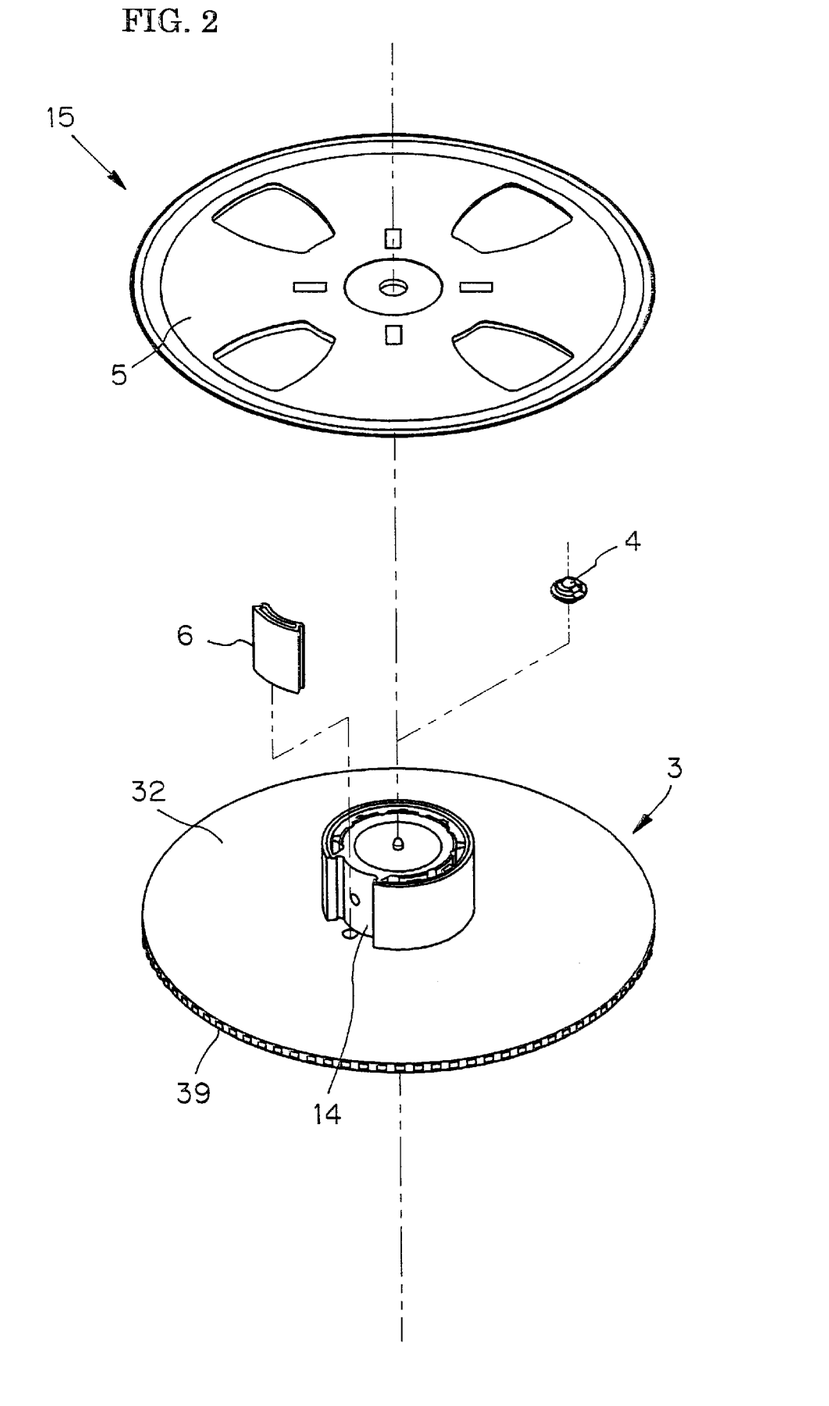
FIG. 2 is an exploded view of a tape reel according to the invention.
Figure 3A:
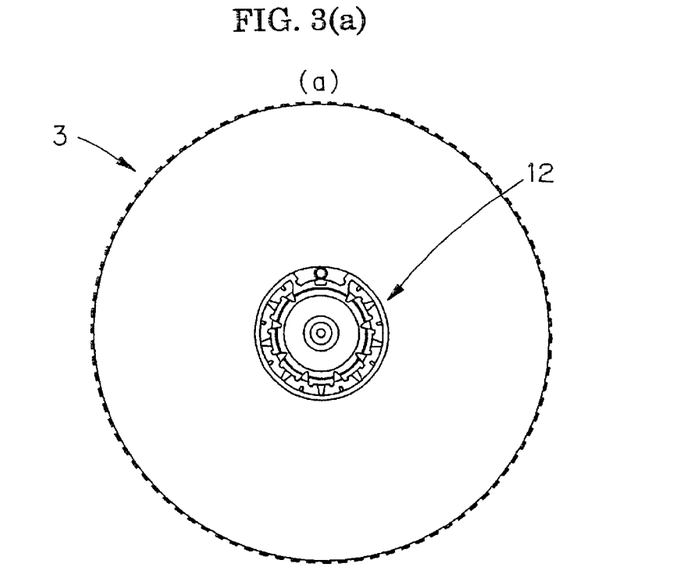
Figure 3B:
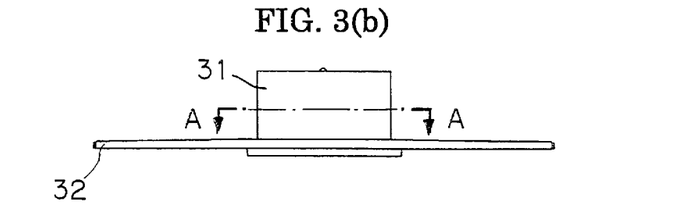
Figure 3C:
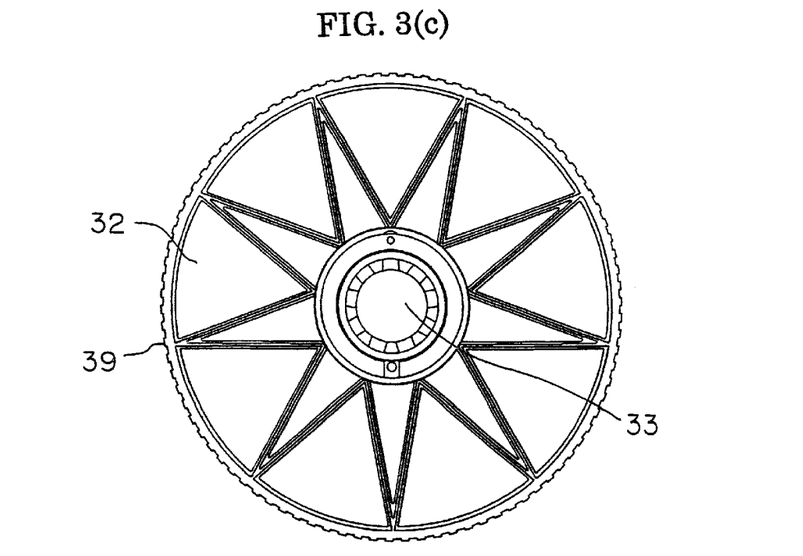

The lower flanges 32 of the tape reels 15 have serrations 39 formed all along their peripheries, so that reel detents 11, 11 held inside the housing come in mesh with the serrations 39 to prevent loosening of the tape when the cassette is not in use. FIG. 2 shows a tape reel 15 in perspective for detailed explanation. FIG. 3 shows its hub; (a) being a plan view, (b) a side view, and (c) a bottom view. The tape reel 15 is made up of the hub 3 which consists of a central drum 12 and a lower flange formed in one piece, an upper flange 5, and a center boss 4 under the urging of a spring 8. The central drum 12 consists of an outer cylindrical part 31 on which a tape 7 is wound and an inner cylindrical part 34 in which a reel driving shaft (not shown) of a recording-reproducing device is to fit. The outer cylindrical part 31 has a recess 14 for receiving a tape clamp 6.

Figure 4A:
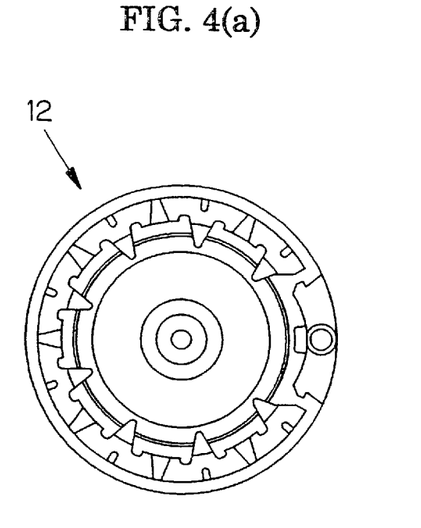
Figure 4B:
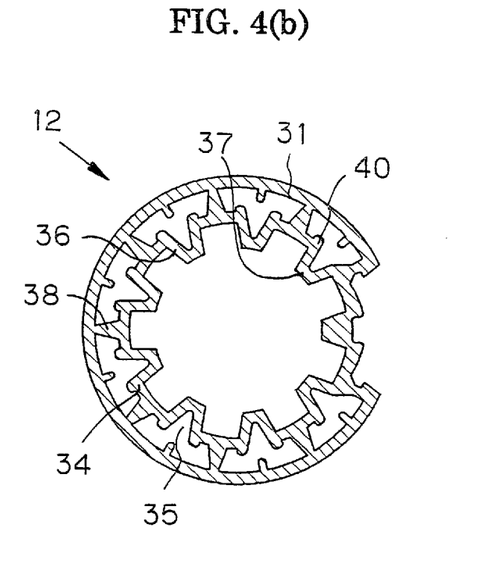

As FIG. 4 shows, the inner cylindrical part 34 has a hollow 33 formed open at the bottom and extending short of the top of the part, so that the driving shaft of the recording-reproducing device can enter the inner cylindrical part 34 to drive the tape reel 15. The inner cylindrical part 34 has a plurality of inward projections 37 adapted to mesh with the driving shaft. As with conventional designs, each of the projections 37 has a groove 35 formed on the back side to reduce its thickness. The outer cylindrical part 31 and the inner cylindrical part 34 are secured together with a plurality of connecting ribs 38.

Thus the inner cylindrical part 34, its inward projections 37 and side walls 36 are made equal in thickness. This permits uniform cooling of the resin after molding and speedup of the molding cycle.

The inner cylindrical part has outward extensions 40 formed on both shoulder portions close to the connecting ribs 38. When the cassette is stored with the tape 7 wound up on the outer cylindrical part 31, the drum 12 is subject to inward forces. The forces are transmitted through the connecting ribs 38 to the inner cylindrical part 34. The extensions 40 formed on both shoulder portions of the inner cylindrical part 34 close to the connecting ribs 38 add sufficient strength, without increasing the thickness of the side walls 36 and projections 37, to prevent deformation of the inner cylindrical part 34. These extensions 40 are just as thick as the other portions. Although the connecting ribs 38 are desired to have the same thickness, they actually have somewhat greater thickness because they are hit by ejector pins when the hub as molded is knocked out of the mold cavity. Since the ribs are located between the inner and outer cylindrical parts, their additional thickness may be practically left out of consideration.

Second Embodiment

Figure 5A:
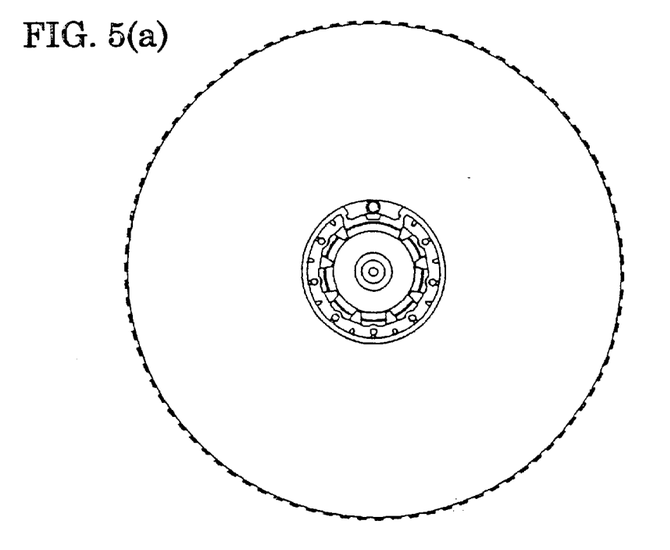
Figure 5B:
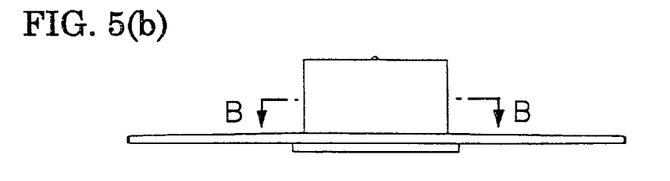
Figure 5C:
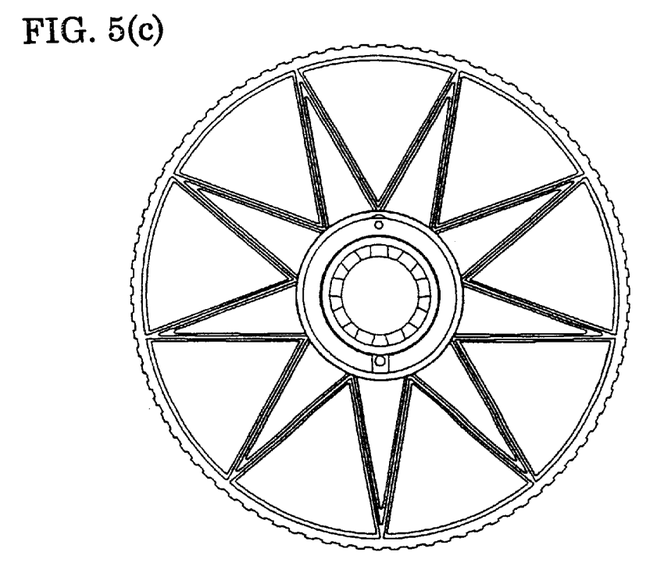
Figure 6A:
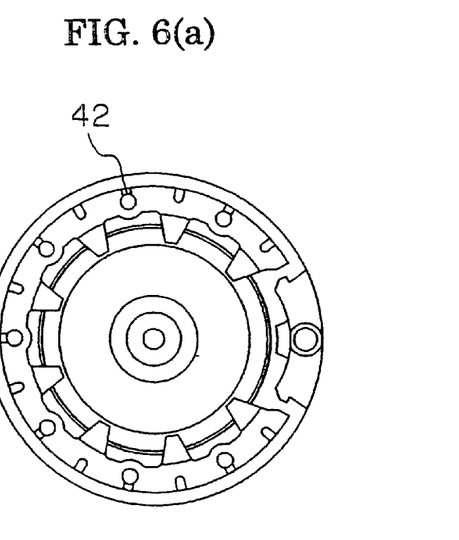
Figure 6B:
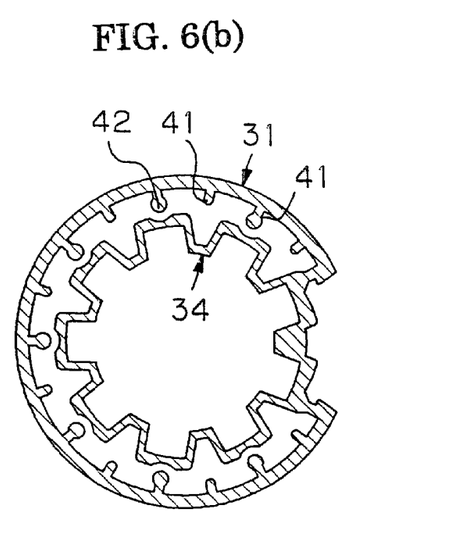

Another embodiment of the invention is illustrated in FIGS. 5 and 6. In this embodiment the tape reel and the outer and inner cylindrical parts of the hub are all exactly the same in structure as those of the first embodiment. Therefore, like parts are designated by like numerals and the detailed explanation is omitted. The only difference is that, unlike the connecting ribs 38 of the first embodiment, ribs 41 that extend from the outer cylindrical part 31 toward but short of the inner cylindrical part 34 are formed at regular intervals along the inner circumference of the outer cylindrical part. These ribs do not transmit the forces that are applied to the outer cylindrical part 31 from the tape 7 wound thereon to the inner cylindrical part 34, precluding the possibility of the inner cylindrical part 34 being deformed by such forces.

In this embodiment every other ribs 41 are shown thickened at the inner end 42 for the mold ejection purpose as with the first embodiment. Their thickness does not have a substantial bearing upon the molding cycle.

With the construction described above, the tape cassette according to the present invention offers the following advantages:

(1) Because its ribs, inner cylindrical part, and connections are all of the same thickness, the thermal shrinkage of moldings remains uniform even when the molding cycles are sped up. Consequently, distortion or warpage of the flange formed integrally with the hub is controlled, and the outer cylindrical part is formed with good precision.

(2) Extensions from the inner cylindrical part toward the outer cylindrical part take up the forces that result from tightened winding of the tape and thereby prevent the deformation of projections (for engagement with a driving shaft).

(3) Separation of the outer and inner cylindrical parts protects the latter from the influence of tightened winding of the tape on the outer cylindrical part, allowing the inner cylindrical part to maintain its positive engagement with the driving shaft of a recording-reproducing device.

What is claimed is:

1. A tape reel for a tape cassette wherein a pair of such reels are contained, comprising an upper flange and a hub which consists of a drum formed integrally with a lower flange, said drum comprising an outer cylindrical part on which a tape is wound and an inner cylindrical part which permits the insertion of a driving shaft of a recording-reproducing device for the tape cassette, characterized in that the inner cylindrical part has projections adapted to engage with the driving shaft, each said projection having a groove formed on the back side for thickness reduction, and the inner cylindrical part and inner ends and both side walls of said projections all have the same thickness.

2. The tape reel for tape cassette according to claim 1 characterized in that a plurality of connecting ribs are provided joining said outer and inner cylindrical parts of said drum, and extensions are formed outwardly on the inner cylindrical part, on both shoulder portions close to each said connecting rib.

3. The tape reel for tape cassette according to claim 1 characterized in that a plurality of ribs are formed along the inner circumference of the outer cylindrical part, extending from the outer cylindrical part toward, but short of, the inner cylindrical part.

* * * * *